United States Patent

Ford et al.

[11] Patent Number: 5,943,158
[45] Date of Patent: Aug. 24, 1999

[54] MICRO-MECHANICAL, ANTI-REFLECTION, SWITCHED OPTICAL MODULATOR ARRAY AND FABRICATION METHOD

[75] Inventors: Joseph Earl Ford, Oakhurst; Keith Wayne Goossen, Aberdeen; James Albert Walker, Howell, all of N.J.

[73] Assignee: Lucent Technologies Inc., Murray Hill, N.J.

[21] Appl. No.: 09/073,052

[22] Filed: May 5, 1998

[51] Int. Cl.⁶ .............................. G02B 26/08; G02B 26/02
[52] U.S. Cl. ..................... 359/295; 359/290; 359/291; 359/318
[58] Field of Search ................................ 359/223, 224, 359/290, 291, 295, 318, 855

[56] References Cited

U.S. PATENT DOCUMENTS 5,646,772  7/1997  Yurke .................................. 359/290
5,774,252  6/1998  Lin et al. ............................. 359/224

OTHER PUBLICATIONS

K. W. Goossen, J. A. Walker, and S. C. Arney, "Silicon Modulator Based on Mechanically-Active Anti-Reflection Layer with 1 Mbit/sec Capability for Fiber-in-the-Loop Applications" IEEE Photonics Technology Letters, vol. 6, No. 9, Sep. 1994.

*Primary Examiner*—Georgia Epps
*Assistant Examiner*—Margaret Burke
*Attorney, Agent, or Firm*—Jeffery J. Brosemer

[57] ABSTRACT

A micro-mechanical, anti-reflective, switched optical modular array that utilizes a continuous, uninterrupted modular membrane across an array of individual modulators. The individual modulators are positioned within an optical window of the device, the optical window being defined by a region of the membrane situated between an array of electrode pairs, where an individual pair of electrodes is used to control an individual one of the modulators. Alternative electrode shapes and fabrication methods are described.

13 Claims, 10 Drawing Sheets

DIELECTRIC MIRROR — ANTI-REFLECTION COATING

400A

400B

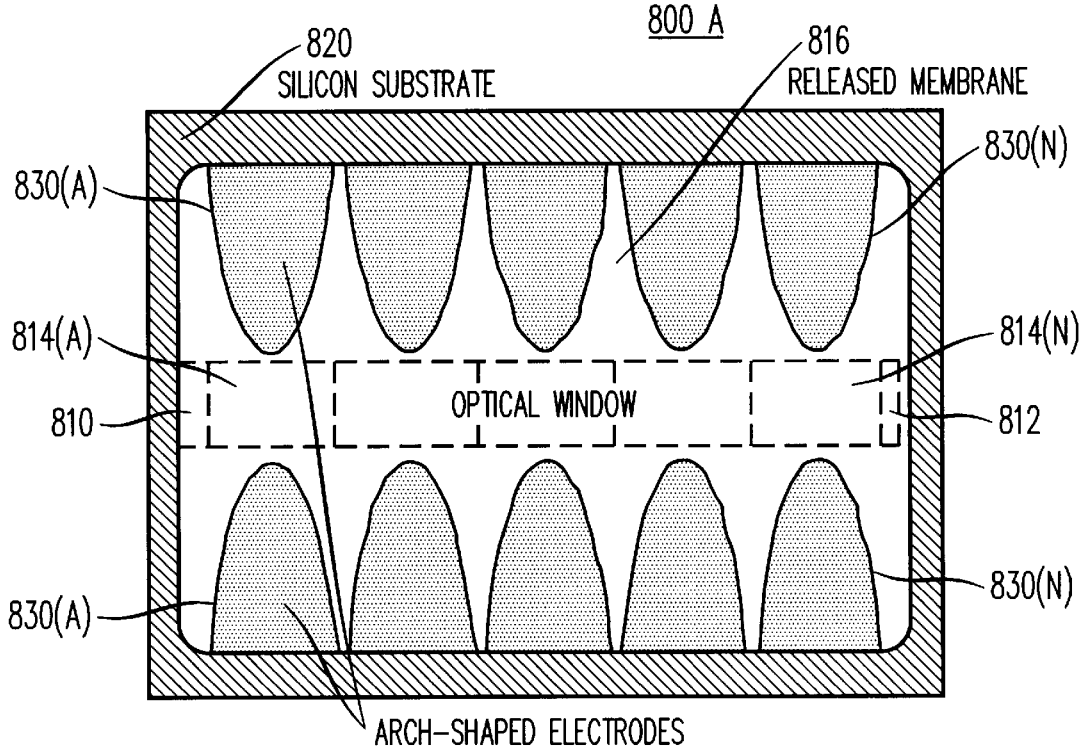
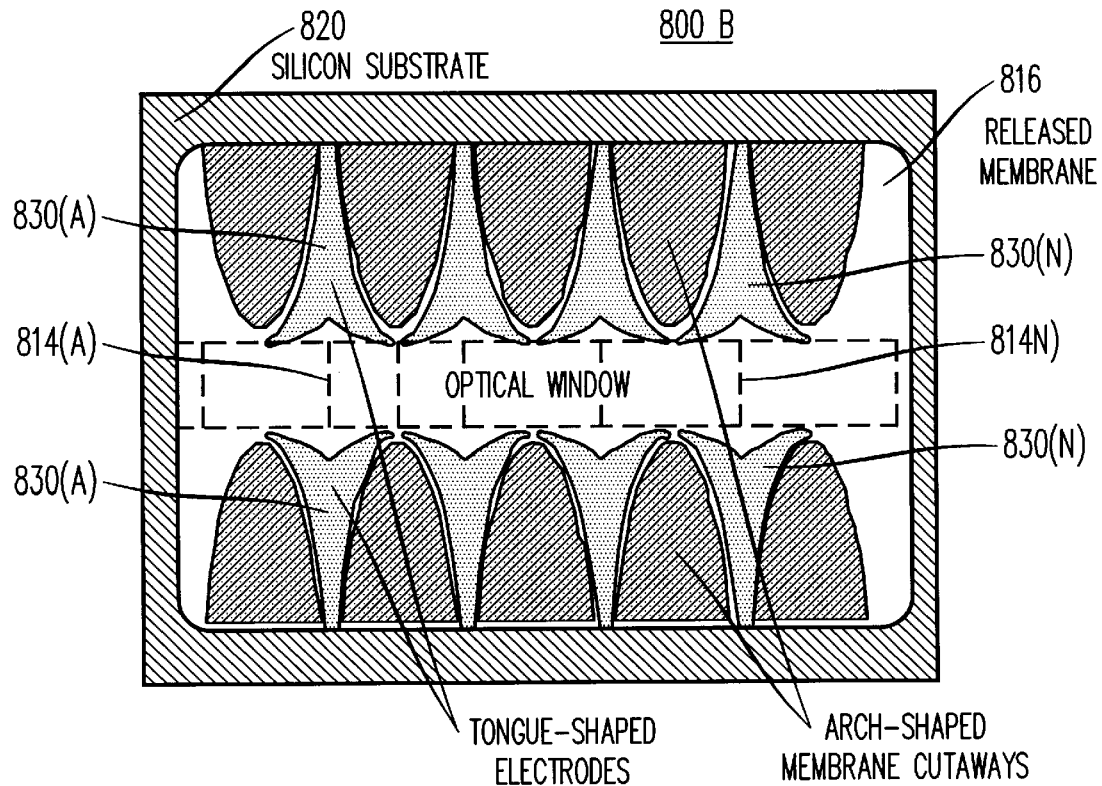

1000

1100

1200

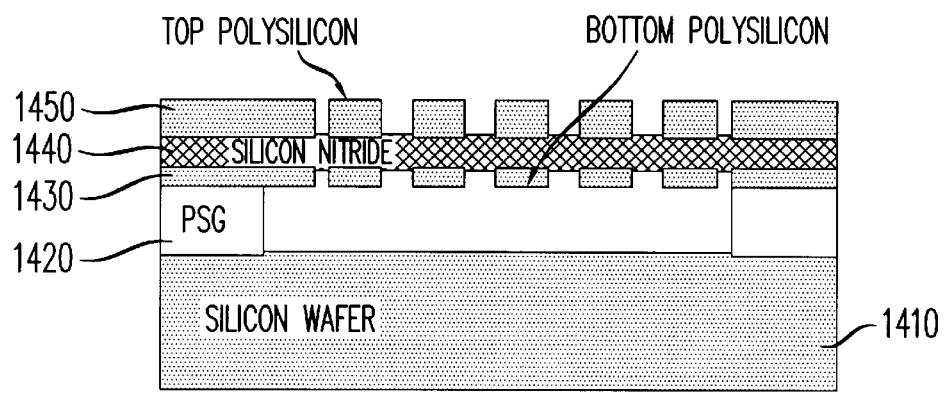
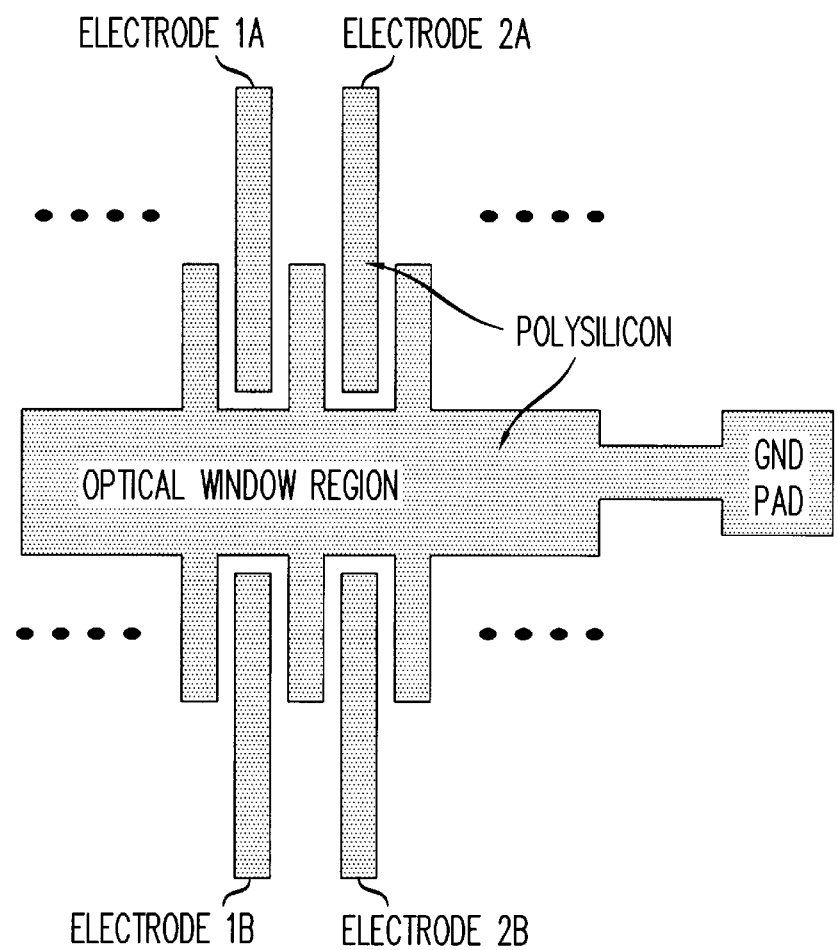

MICRO-MECHANICAL, ANTI-REFLECTION, SWITCHED OPTICAL MODULATOR ARRAY AND FABRICATION METHOD

TECHNICAL FIELD

This invention relates generally to the field of optical communications and in particular to an optical modulator array suitable for Wavelength-Division-Multiplexed optical communications.

BACKGROUND OF THE INVENTION

A Wavelength-Division-Multiplexed (WDM) transmission link often includes multiple segments of transmission fiber separated by one or more optical amplifiers and other fiber optic components. Generally speaking, it is desirable that these links exhibit uniform signal transmission for all wavelengths. Unfortunately however, non-uniformity in gain and loss accumulate and eventually cause transmission errors unless the signal is equalized.

Such equalization in wavelength division multiplexed systems may be achieved by a variety of means including signal pre-emphasis, fixed fiber gratings, and individual attenuators placed between wavelength routers. Each of these approaches represents a tradeoff in network operator flexibility.

An approach to WDM equalization was described by the inventors of the present application in U.S. patent application Ser. No. 08/690,696 filed on Jul. 31, 1996 for an Attenuation Device For Wavelength Multiplexed Optical Fiber Communications and is incorporated herein by reference. This previous approach, involved multiple wavelength signals in an optical fiber spatially dispersed by wavelength over a row of voltage-controlled variable reflectivity modulators in which reflected (and attenuated) signals are combined into a single optical output fiber. Despite advantages of this technique, a continuing need exists in the art for equalization apparatus and techniques that provide enhanced optical performance.

SUMMARY OF THE INVENTION

An advance is made over the prior art in accordance with the principles of the present invention which is directed to an improved modulator array that uses a single mechanically continuous modulator strip having discrete, individual electrical actuators distributed along its length. Viewed from one aspect, the present invention is directed to a modulator array device that exhibits a continuous, uniform optical surface, resulting in improved power efficiency and attenuation dynamic range. And while prior modulators specified the wavelength pitch of allowed signals, our new continuous strip modulator allows for an arbitrary wavelength spacing of the optical signals.

Viewed from another aspect, the present invention is directed to a method for fabricating the improved modulator array. Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawing, in which:

FIG. 4b shows an active region for the MARS variable-reflectivity strip mirror of FIG. 4a;

FIG. 8a shows an exemplary electrode pattern;

FIG. 8b shown an alternative electrode pattern;

FIG. 14 shows a resulting film structure of a patterned polysilicon equalizer structure; and FIG. 15 shows patterned bottom polysilicon for the device of FIG. 14.

DETAILED DESCRIPTION

A preferred embodiment of the invention will now be described while referring to the figures, several of which may be simultaneously referred to during the course of the following description.

Figure 1:
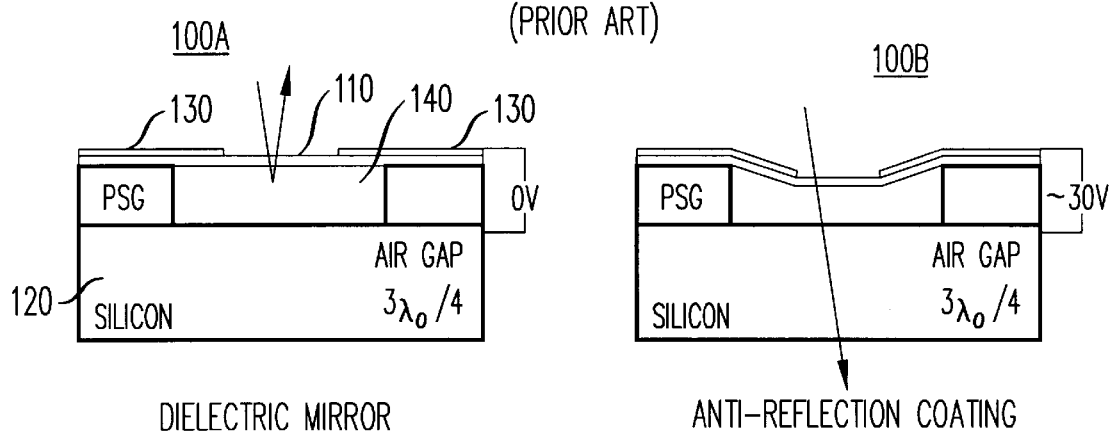
FIG. 1 shows a prior art MARS modulator functioning as a dielectric mirror and as an anti-reflector upon actuation.

A MARS (mechanical anti-reflection switch) modulator such as that described by K. Goossen, J. Walker, and S. Arney, in IEEE Phot. Tech. Lett. 6, p.1119, 1994, and shown in FIG. 1 is substantially a vertically moving anti-reflective coating overlying an air gap on a substrate. Such a device is based on optical interference effects between the vertically moving membrane and the substrate. More specifically, a silicon nitride ¼λ layer or membrane 110 is separated from a substrate 120 by a fixed ¾λ space or air gap 140 and may be made to act as a dielectric mirror exhibiting about 72% reflectivity.

Operationally, a voltage applied between the electrodes 130 positioned on top of the membrane 110 and the substrate 120 creates an electrostatic force that pulls the membrane 110 physically closer to the substrate 120. When the air gap between the membrane and the substrate is reduced to substantially λ/2, an anti-reflective device exhibiting substantially zero reflectivity is produced. As can be readily appreciated by those skilled in the art, the vertical deflection that results from the applied voltage is small, i.e., approximately 0.4 microns, when the membrane width is on the order of 200 to 500 microns.

As can be appreciated, this operation is shown diagrammatically in FIG. 1. More specifically, 100A shows that light impinging on the surface of the device is substantially reflected. When the bias is applied, i.e., 30V in 100B, the membrane 110 deforms and the impinging light is not reflected.

The electrodes 130 are provided so that a voltage may be applied across the membrane 110 and the substrate 120. Electrodes 130 may be constructed from a conductive material including, but not limited to, aluminum, platinum, tungsten, conducting silicon, or preferably, gold.

The substrate 120 may be formed of a conductive material that is either transparent or absorbing over an operating optical bandwidth. Suitable substrate materials include, but are not limited to silicon, gallium arsenide, indium phosphide, germanium or indium tin oxide (ITO) coated glass. If a semiconductor material is used as a substrate, it should be appropriately doped with a suitable Group III or Group V element, typically phosphorus or boron.

Figure 2A:
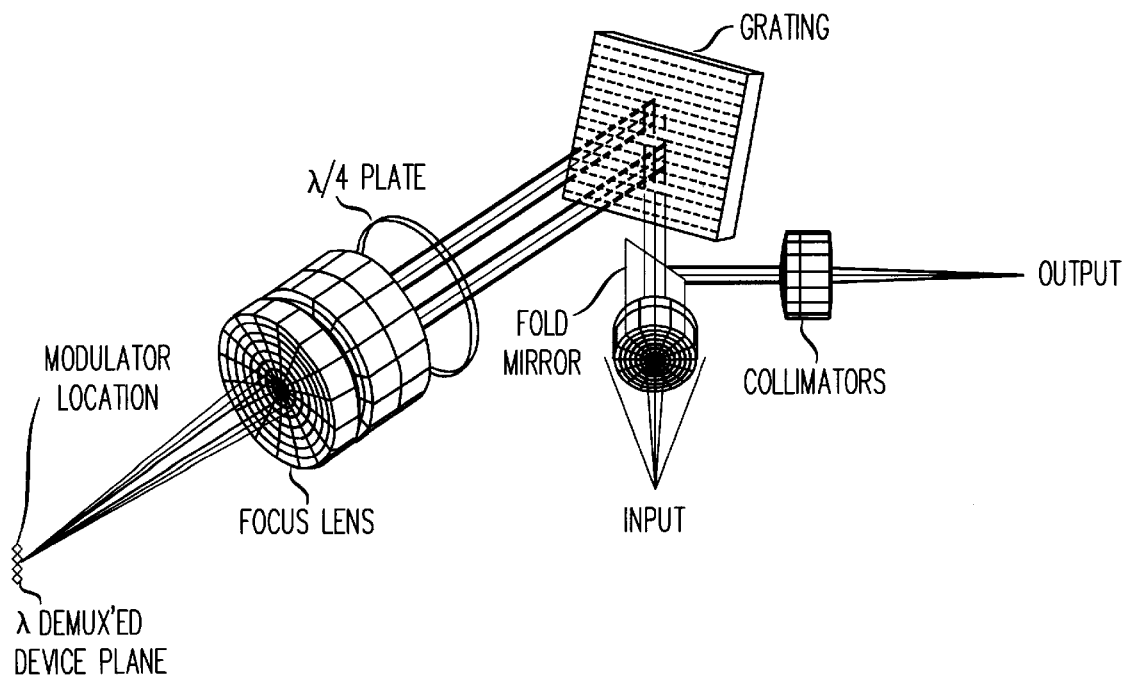
FIG. 2a shows a modulator in a free-space configuration.
Figure 2B:
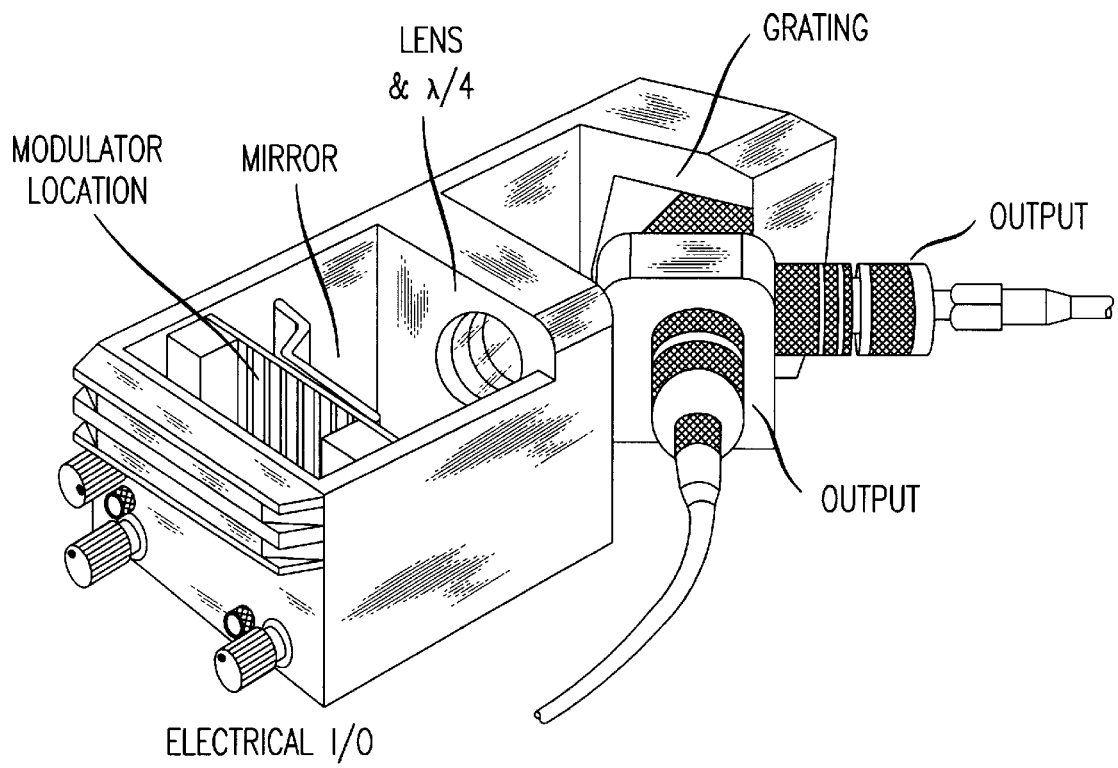
FIG. 2b shows the modulator of FIG. 2a in a typical package.

With simultaneous reference now to FIGS. 2a and 2b, there is shown how a MARS modulator may be used in a WDM equalizer. Specifically, a row of modulators is placed into a free-space optics wavelength multiplexing package and uses refractive optics to image an input fiber through a planar diffraction grating to disperse input light by wavelength across the array. The light is then directed back through the grating into an output fiber (not shown). A quarter wave plate flips the polarization of the light during a second pass through the grating thereby canceling any polarization dependent diffraction losses. With a gold mirror at the device plane, a package such as one shown in FIG. 2b exhibits only 4 dB total insertion loss and 0.2 dB polarization dependent loss.

A MARS WDM equalizer was first reported by J. Ford, J. Walker, M. Nuss and D. Miller, in the Digest IEEE/LEOS 1996 Summer Topical Meetings on Broadband Optical Networks, p.26, 1996. The device described therein used segmented devices, where the silicon nitride membrane was cut between adjacent electrodes thereby making each modulator mechanically independent.

Figure 3:
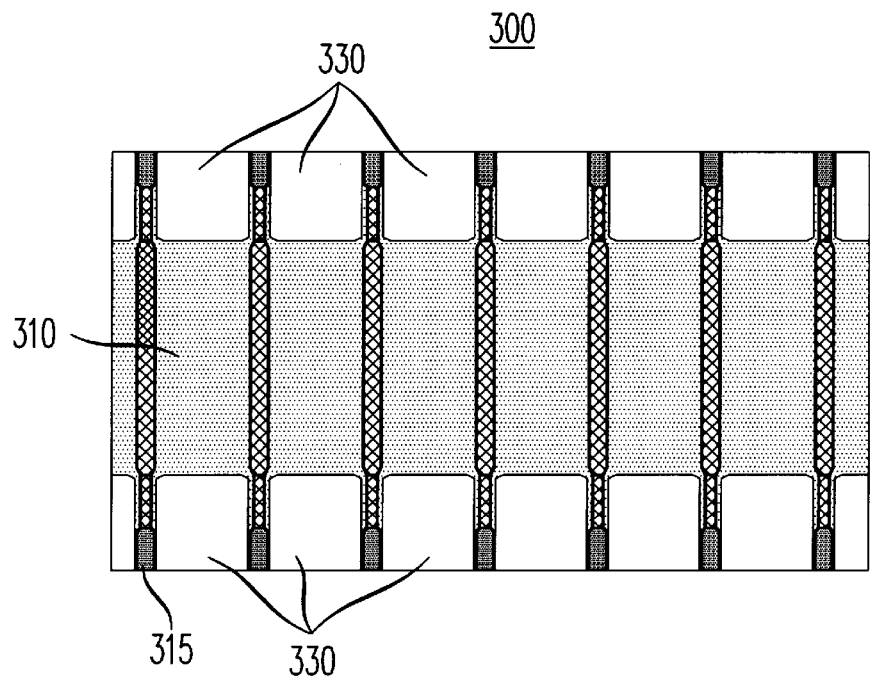
FIG. 3 shows a prior art MARS variable-reflectivity strip mirror.

Such a prior art segmented device 300 is shown in FIG. 3. In particular, an array of electrode pairs 330 is disposed on a substrate (not shown) overlying membrane 310 which is disposed on the substrate such that a gap exists between the surface of the membrane 310 and the substrate. Shown further, are a series of cuts, or interruptions 315 between each pair of electrodes 330 which mechanically un-couples adjacent portions of membrane between the electrode pairs 330. Unfortunately, devices such as 300 exhibited nonuniform attenuation across the width of each device and undesirably narrow wavelength passbands.

Our inventive modulator utilizes a continuous, unbroken modulator membrane strip and electrodes for applying force at discrete steps along the continuous membrane. Advantageously, the membrane deflection for our inventive device is characterized by smooth, shallow depressions (of up to 0.4 microns across a 290 micron suspended width) created when an activation voltage is applied.

Figure 4A:
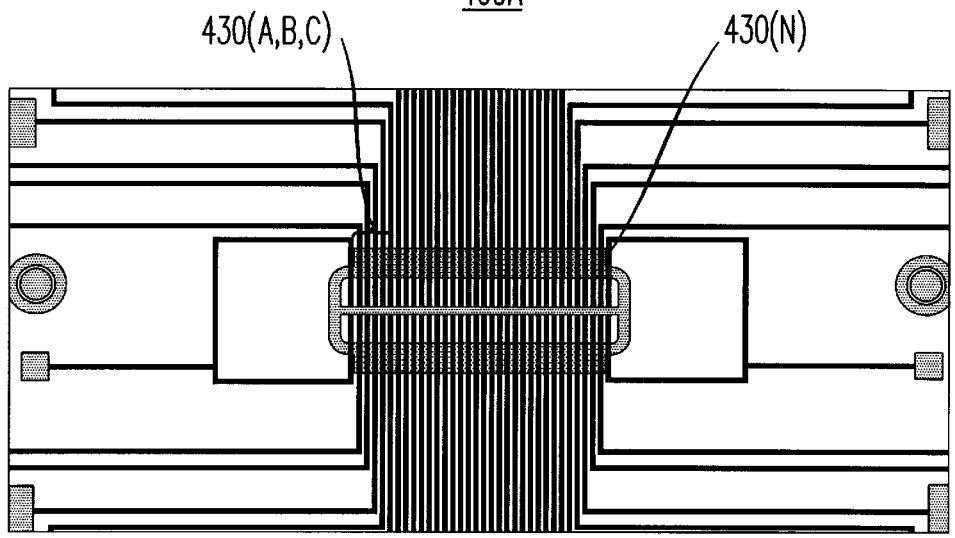
FIG. 4a shows an integrated circuit layout for a MARS variable-reflectivity strip mirror according to the teachings of the present invention.

FIG. 4a shows a layout 400A, used for the construction of our inventive with a number of features identified device. The device constructed from this layout is shown as 400B in FIG. 4b. Specifically shown therein is an array of electrode pairs 430(a. . . n) overlying a membrane 410. The electrode pairs 430(a. . . n) are arranged on the membrane so that an optical window region 412 is defined by the electrode pairs 430(a. . . n). While the optical window region 412 is shown as rectangular in shape, those skilled in the art will recognize that the shape of the optical window region 412 may be other shapes, as desired and as generally defined by electrode placement.

Figure 4B:
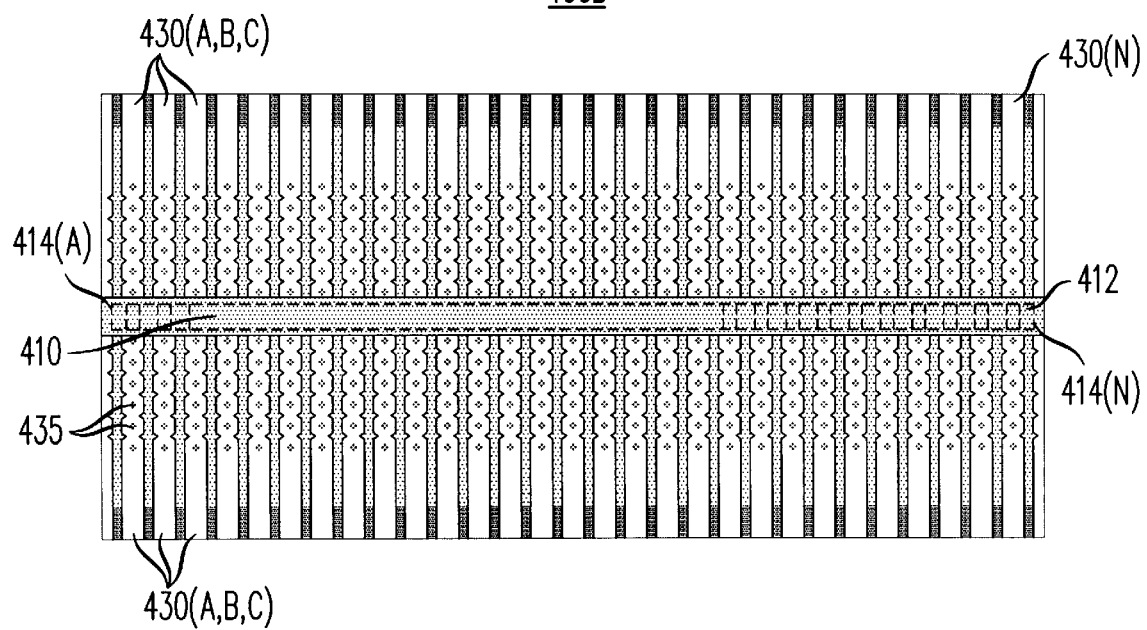

As with the prior art devices, the membrane 410 overlies an air gap (not shown) see FIG. 1 which overlies a substrate (not shown) see FIG. 1. Shown further in FIG. 4b are individual modulators 414(a. . . n) which correspond with an individual electrode pair 430(a. . . n), respectively. Advantageously, when a bias is applied to a particular electrode pair within the array of electrode pairs 430(a. . . n), the corresponding modulator 414(a. . . n) is activated within the optical window region 412. Furthermore, and according to our inventive teachings, the modulator strip 410 is uninterrupted along its length within the optical window region 412.

Shown further in FIG. 4b are dampeners 435 which may be formed in one or more of the electrodes. As shown in this particular example, the dampeners may comprise holes or passages through individual electrodes into the air gap region. In this manner, when an individual modulator is activated and the membrane is vertically displaced, the holes allow for the pressure between the air gap and the general atmosphere to equalize. Additionally dampening may be provided by the shape of the electrodes and the region between adjacent electrodes.

We have determined that this structure increases mechanical coupling between channels and at the same time produces a desirable optical surface. In the device shown in FIGS. 4a and 4b, the optically active region is a strip approximately 40 microns wide by approximately 1 mm long, with 32 electrodes spaced at a 28 micron pitch (0.8 nm in wavelength).

Figure 5:
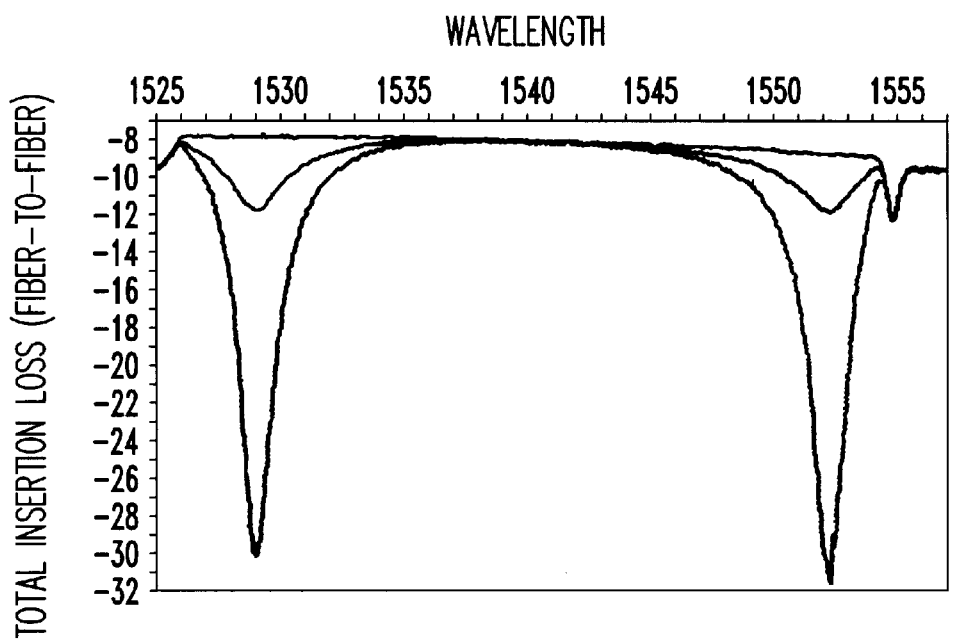
FIG. 5 shows a plot of attenuation vs. wavelength for a MARS device having two widely space electrodes having zero, 30 and 60 volts applied.

When 0 to 60 V is applied to one electrode of a device so packaged, a 3 nm wide Gaussian-shaped feature exhibiting 22 dB dynamic range is produced. Intermediate regions between two nearby features are somewhat attenuated. For example, the midpoint between two 15 dB depressions separated by 7 nm exhibits about 5 dB loss. Consequently, an equalizer constructed according to our teachings can produce an arbitrary smooth variation in transmission. A plot of the attenuation versus wavelength for such a device is shown in FIG. 5, where two widely spaced electrodes have zero, 30 and 60 volts applied to them to create increasingly deep features (non reflective regions) at the ends of the continuous strip.

Figure 6:
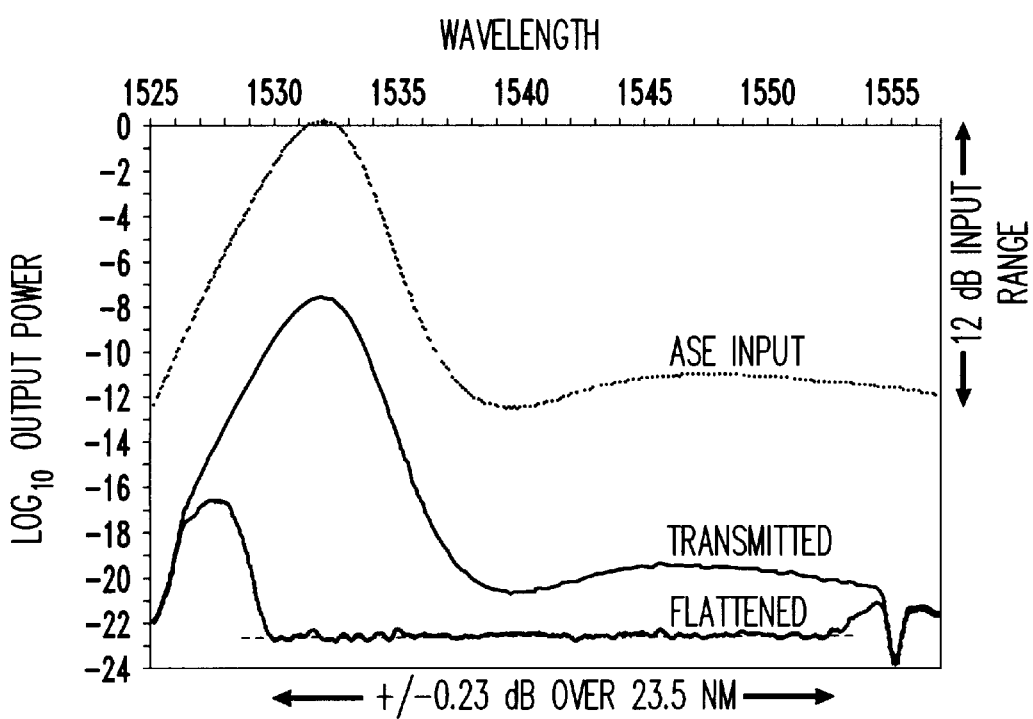
FIG. 6 shows a plot of equalized, erbium fiber amplifier amplified spontaneous emission (ASE)

FIG. 6 shows how an equalizer constructed according to our teachings can flatten non-uniform amplifier gain. With reference now to that Figure, the upper curve depicts an original amplified spontaneous emission (ASE) output of an Erbium-doped fiber amplifier having no input signal. The ASE has >12 dB dynamic range. When this signal is transmitted through the equalizer as previously described (with zero applied voltage) the excess loss varies smoothly from 8 to 9 dB across the 24 nm operating range. With an appropriate voltage setting, the ASE signal was flattened to <0.5 dB over a 23.5 nm bandwidth. Because the ASE output of an amplifier is proportional to the small signal gain, those skilled in the art will quickly recognize that that the equalizer can flatten a nonuniform amplifier gain.

The small ripples in loss (with less than 0.5 dB total excursion) visible in FIG. 6 may be due, in part, to scatter off the gold electrodes and to small surface features in the window created by applying force to a square electrode shape. Increasing the optical window width by 50%, and re-designing the electrode to have a smoothly rounded (arch-shaped) profile reduce the ripple in the transmission function.

Figure 7A:
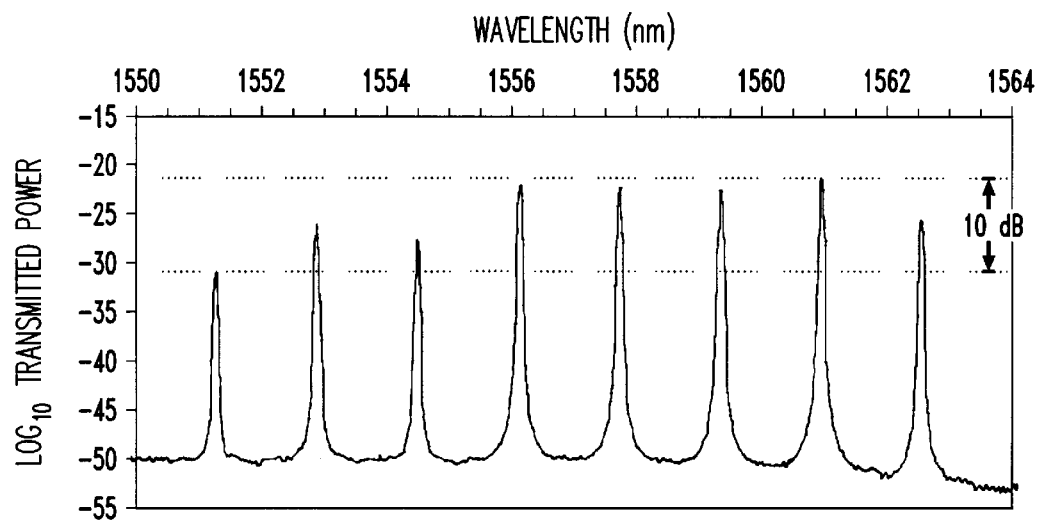
FIG. 7a is a plot showing flattened and amplified laser output for eight lasers.
Figure 7B:
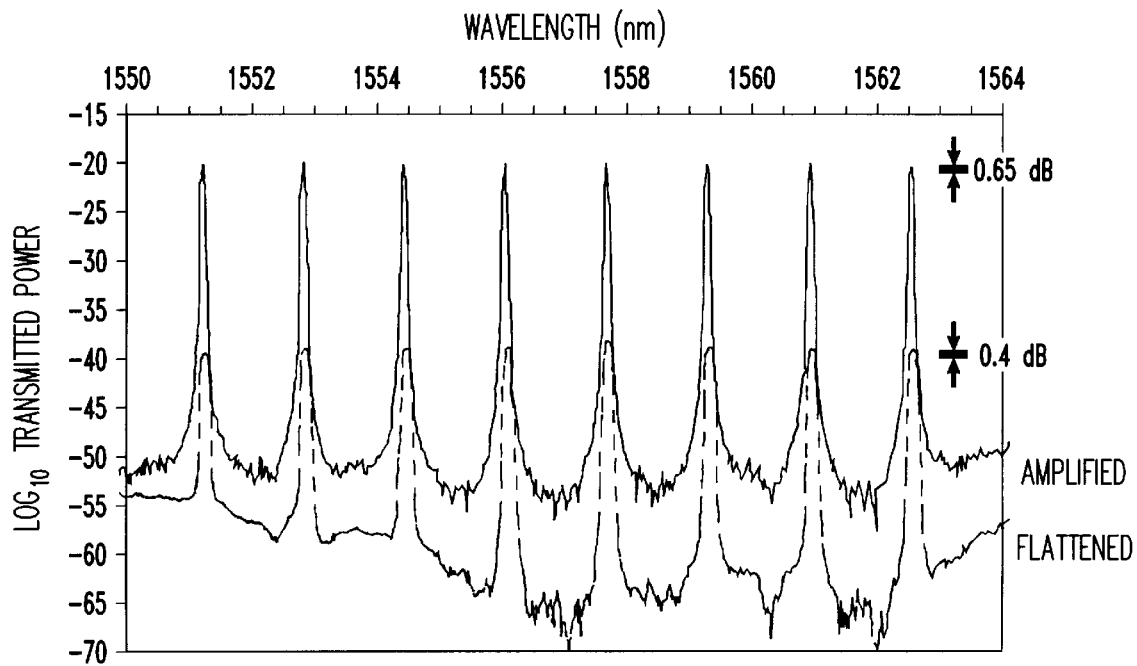
FIG. 7b is a plot showing nonuniform input levels from eight lasers.

The equalizer so constructed was also used to demonstrate flattening of multiple individual laser inputs. With reference now to FIG. 7a, there is shown 8 laser signals at 200 GHz pitch (transmitted though the switched-off equalizer) with signal levels that vary by an order of magnitude. FIG. 7b shows that when the equalizer is switched on and suitably adjusted, the transmitted signal levels are equalized to 0.4 dB variation. The smooth variation in the additional loss incurs an additional 8 dB loss below the original minimum power. However, the original signal level can be recovered using an amplifier. FIG. 7 also shows the output after amplification, where in fact the attenuation control was re-adjusted to compensate for amplifier non-uniformity to produce only 0.65 dB level variation.

Underlying structures such as the air gap and substrate are not shown in these figures, however they may be seen with simultaneous reference to FIG. 1.

FIGS. 8a and 8b show two electrode layout variations that minimizing ripples and improve optical uniformity within a continuous passband. FIG. 8a shows a device 800A that utilizes an "arch-type" electrode shape, that eliminates sharp corners and distributes the force from a rigid (relatively inflexible) electrode uniformly over the segment of modulator strip. In particular, and as shown in FIG. 8A, an array of arch-shaped electrode pairs 830(a. . . n) are disposed on membrane 810 which in turn overlies a gap region (not shown) which further overlies a substrate 820. As with the prior embodiments, the array of electrode pairs defines an optical window region 812 of membrane 810 which may be further described by individual modulator regions 814(a. . . n) within the optical window region 812 that correspond to a particular pair of electrodes 830(a. . . n). Shown further in this embodiment, is a released membrane region 816 which is positioned between each adjacent arch shaped electrode.

FIG. 8b shows a device 800b having a "tongue" electrode shape, that uses (optional) arch-shaped cuts in the membrane outside of the optically illuminated window to further reduce the mechanical coupling between adjacent electrodes, and hence increase the wavelength resolution of the WDM equalizer transfer function.

Figure 9:
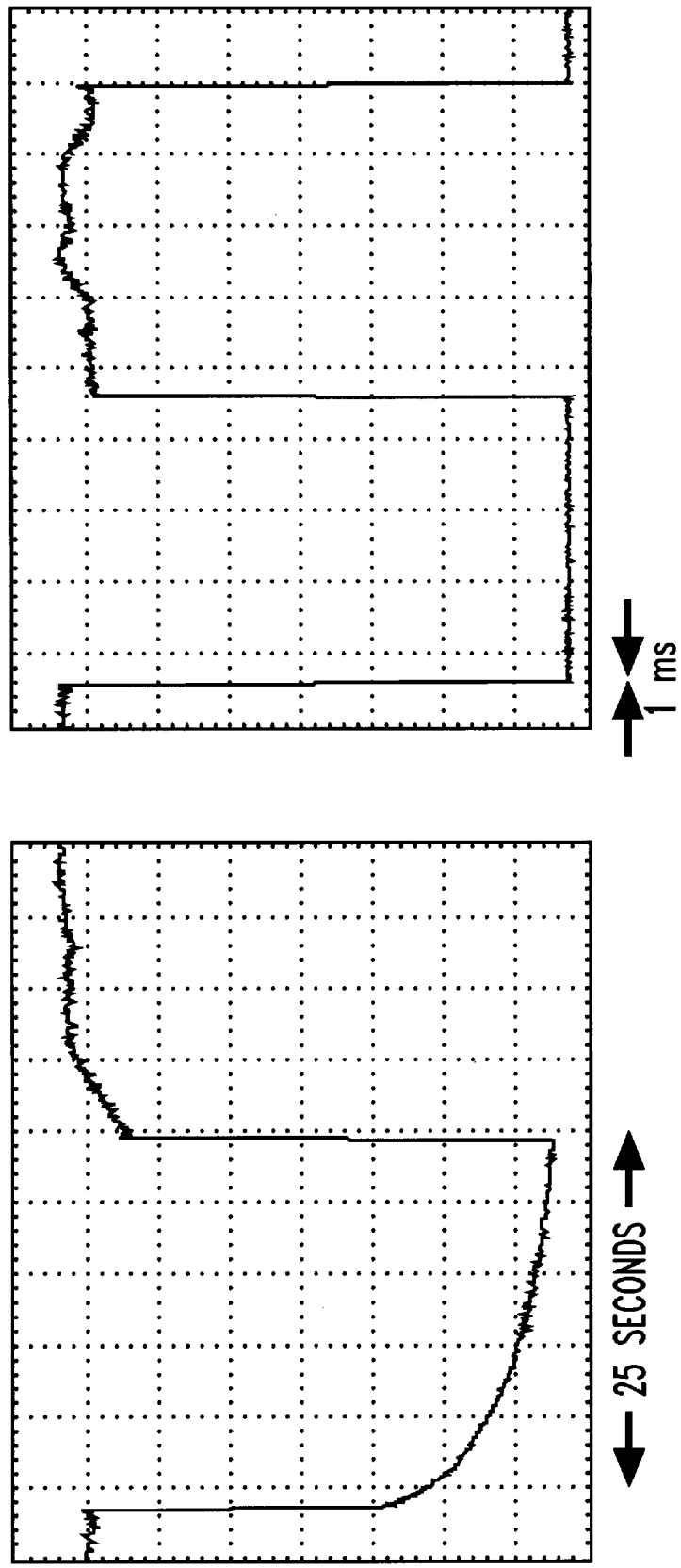
FIG. 9 is a graph showing equalizer time dynamics for a device according to the present invention.

FIG. 9 is a plot showing the equalizer time dynamics for an equalizer constructed according to the present invention. The rise and fall time is less than 10 microseconds, followed by a slow relaxation effect (left trace) possibly due to static charge build-up on the dielectric membrane. Closed-loop feedback can suppress this effect and achieve fast response over a range limited by the total static charging (sacrificing 1–2 dB of the original dynamic range). The right trace shows fast, high-contrast equalizer response to an increased voltage step.

Ion Implantation Isolated Continuous Strip Fabrication

Figure 10:
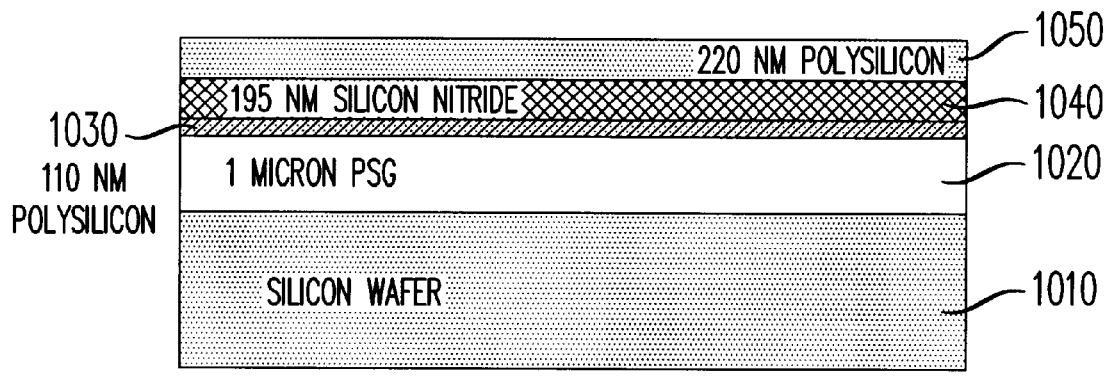
FIG. 10 shows a cross section of a full surface film structure for equalizer fabrication.

The fabrication of our inventive device is relatively straightforward, utilizing known materials and variations of known methods. In one exemplary fabrication, a series of Low Pressure Chemical Vapor Depositions are performed to yield the device structure 1000 shown in FIG. 10. Specifically, a phosphosilicate glass layer 1020 is deposited on a silicon wafer 1010. Overlying the glass layer 1020 is a polysilicon layer 1030, a silicon nitride layer 1040 and a second polysilicon layer 1050. As will become apparent, the two polysilicon layers 1030, 1050 form the conductive layers of the finished device and the silicon nitride layer 1040 forms the $\lambda/4$ layer.

Figure 11:
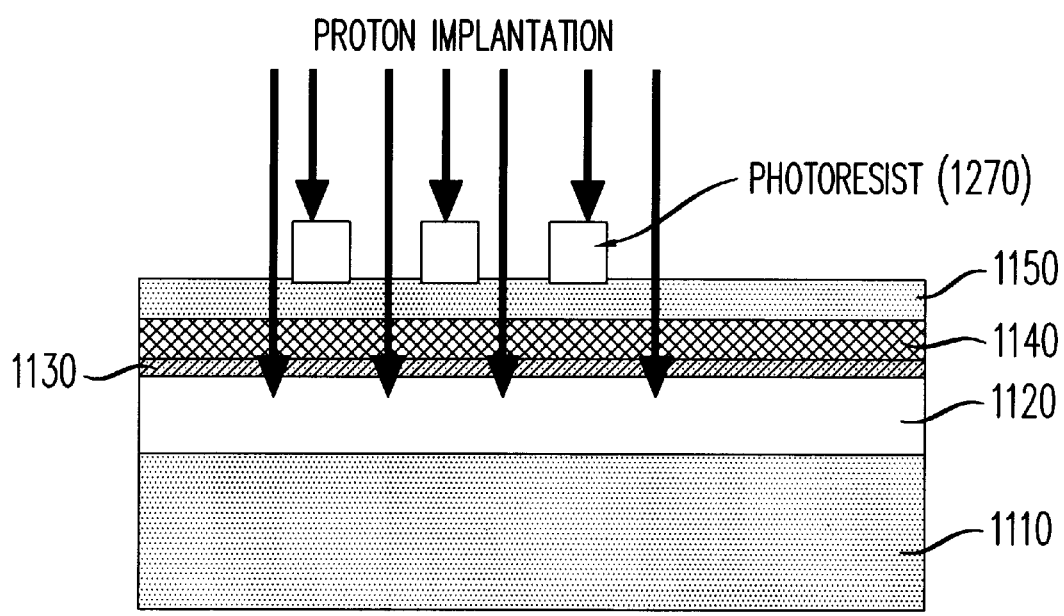
FIG. 11 shows a proton implantation mask applied to the film of FIG. 10.
Figure 12:
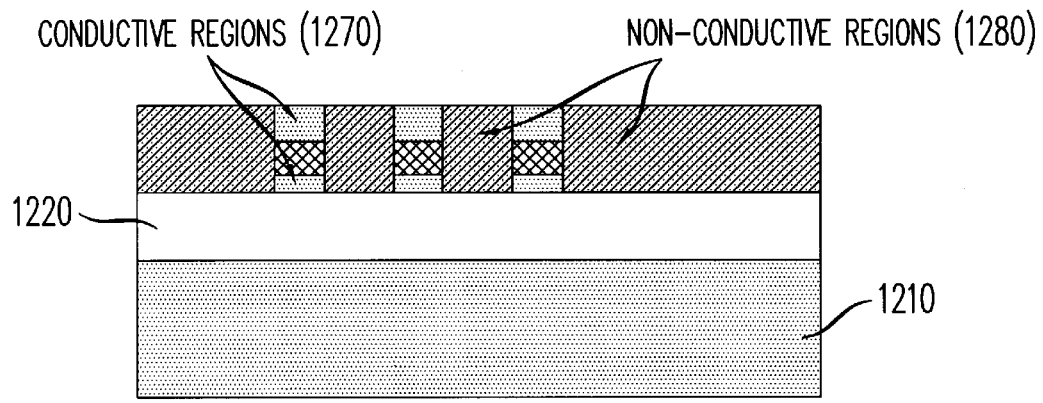
FIG. 12 shows electrical configuration of the film of FIG. 10 after implantation using mask of FIG. 11.
Figure 13:
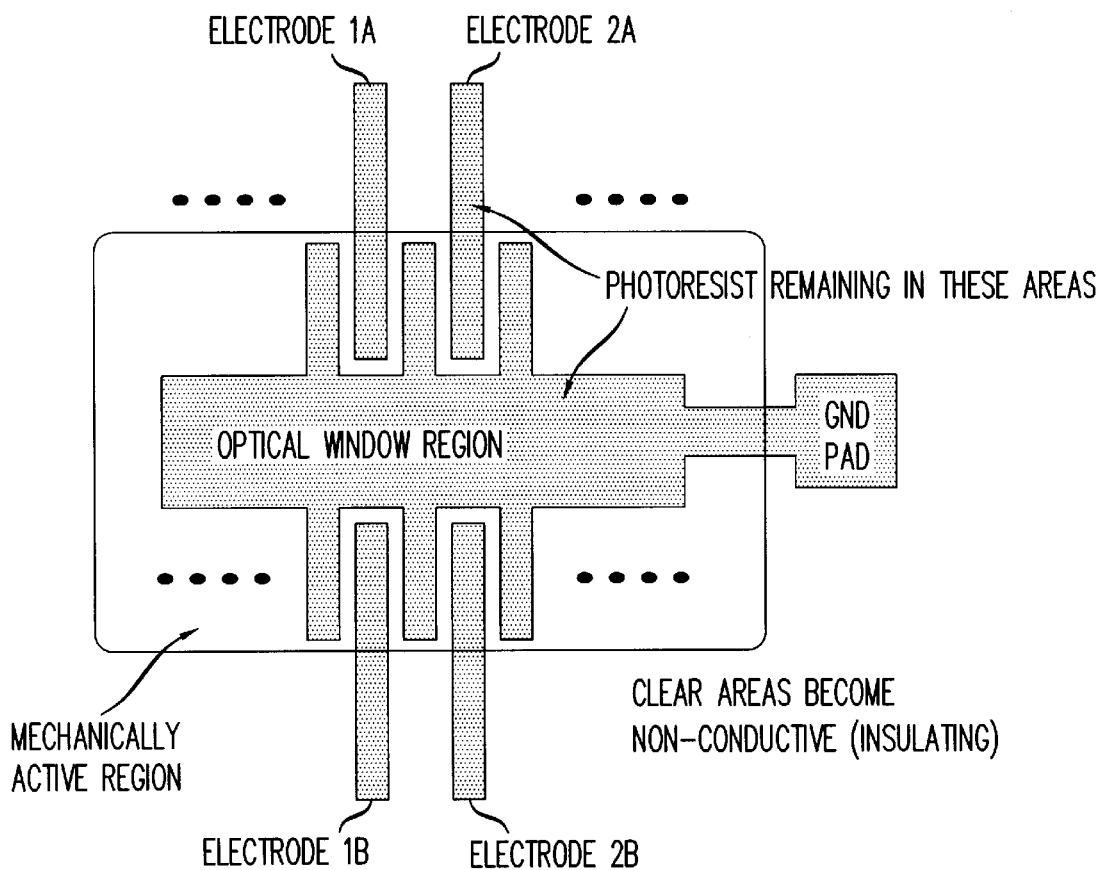
FIG. 13 is a mask showing regions which will remain conductive after ion implantation.

The polysilicon layers 1030, 1050 are doped through contact with phosphosilicate glass (PSG) films and subsequent thermal anneals (not shown). Once the film structure in FIG. 10 has been prepared, and with reference now to FIG. 11, a pattern of photoresist 1160 is then applied and patterned such that openings are formed over areas where it is desirable to have non-conductive areas of polysilicon. As can be readily appreciated, these areas specifically isolate individual electrodes from each other, as well as from the optical window region and its associated grounding electrode. The photoresist coated wafer 1100 is then subjected to proton implantation of sufficient energy and dosage so as to eliminate electrical conductivity of both polysilicon films in the exposed regions. With reference now to FIG. 12, a device 1200 is produced having non-conductive regions 1280 thereby providing electrical isolation in these areas. A top view of an implantation mask suitable for this operation is shown in FIG. 13.

Wet etch access holes are then opened through both polysilicon films and the nitride film down to the PSG layer using reactive ion etching (RIE). These holes are located appropriately in the desired mechanically active region to provide proper mechanical damping to the finished device. Finally, the wafer is immersed in an HF solution, which etches selectively the PSG, undercutting the entire desired mechanically active region.

Patterned Dual Polysilicon Process

Alternatively, a $\lambda \cdot \frac{3}{4}$ thick layer (roughly 1.1 mm) of Phosphosilicate Glass (PSG) 1420 is deposited using Low Pressure Chemical Vapor Deposition (LPCVD) on a heavily doped silicon wafer 1410. A $\lambda/4$ thick layer (roughly 1100 Å) of polysilicon 1430 is then LPCVD deposited on top of the PSG 1420. This overlying layer is patterned using reactive ion etching (RIE) to obtain physically isolated regions of conductive polysilicon in three distinct areas, an optically active region, an electrically and mechanically active region, and isolation regions between electrode fingers. After patterning the polysilicon, a second PSG deposition is performed followed by chemo-mechanical polishing until a planarized surface is produced. Subsequently, an LPCVD film of silicon nitride (refractive index approximately 2.0) 1440 is deposited on the wafer to a thickness equal to substantially $\lambda/4$, or roughly 1950 Å. A second LPCVD polysilicon film 1450 is the deposited and patterned identical to the first but oh top of the silicon nitride as shown in FIG. 14. A top view of a representative layout is shown in FIG. 15.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The invention claimed is:

1. A micro-mechanical, switched optical modulator array comprising:
   a substrate;
   a gap layer, overlying the substrate;
   a continuous, uninterrupted modulator layer overlying the gap layer; and
   an electrode layer, overlying the modulator layer, the electrode layer including
      an array of arch-shaped electrodes arranged in individual mated pairs distributed along a length of the modulator layer, each individual pair disposed along opposite sides of a top surface of the modulator layer such than none of the electrodes overlies an entire width of the modulator layer and an active optical window region is defined for each mated pair therebetween the individual electrodes comprising the mated pair;

wherein the active optical window region of the modulator between an individual pair of arch shaped electrodes is substantially reflective to incident light when no potential is applied between the electrode pair and the substrate and the active optical window region of the modulator between the individual pair of electrodes is substantially non-reflective when a potential is applied between the electrode pair and the substrate.

2. The micro-mechanical, switched optical modulator array according to claim 1 wherein the reflective to non-reflective transition of the modulator is effected by a mechanical deformation of the modulation layer.

3. The micro-mechanical, switched optical modulator array according to claim 2 wherein the gap layer has a thickness of substantially ¾λ and λ is the wavelength of the incident light.

4. The micro-mechanical, switched optical modulator array according to claim 1 wherein the reflective to non-reflective transition of the modulator is effected by a mechanical deformation of the modulation layer.

5. The micro-mechanical, switched optical modulator array according to claim 4 further comprising a means for dampening the modulator membrane.

6. The micro-mechanical, switched optical modulator array according to claim 5 wherein the dampening means includes one or more vents, enabling fluid communication between the air gap and an external atmosphere.

7. A micro-mechanical, switched optical modulator array comprising:
   a substrate;
   a gap layer, overlying the substrate;
   a continuous, uninterrupted modulator layer overlying the gap layer; and
   an electrode layer, overlying the modulator layer, the electrode layer including
      an array of tongue-shaped electrodes arranged in individual mated pairs distributed along a length of the modulator layer, each individual electrode of a particular mated pair disposed along opposite sides of a top surface of the modulator layer such than none of the electrodes overlies an entire width of the modulator layer and an active optical window region is defined for each mated pair therebetween the individual electrodes comprising the mated pair;

wherein the active optical window region of the modulator between an individual pair of tongue shaped electrodes is substantially reflective to incident light when no potential is applied between the electrode pair and the substrate and the active optical window region of the modulator between the individual pair of electrodes is substantially non-reflective when a potential is applied between the electrode pair and the substrate.

8. The micro-mechanical, switched optical modulator array according to claim 7 wherein the reflective to non-reflective transition of the modulator is effected by a mechanical deformation of the modulation layer.

9. The micro-mechanical, switched optical modulator array according to claim 8 wherein the gap layer has a thickness of substantially ¾λ and λ is the wavelength of the incident light.

10. The micro-mechanical, switched optical modulator array according to claim 9 wherein the reflective to non-reflective transition of the modulator is effected by a mechanical deformation of the modulation layer.

11. The micro-mechanical, switched optical modulator array according to claim 10 further comprising a means for dampening the modulator membrane.

12. The micro-mechanical, switched optical modulator array according to claim 11 wherein the dampening means includes one or more vents, enabling fluid communication between the air gap and an external atmosphere.

13. The micro-mechanical, switched optical modulator array according to claim 7 wherein the modulator layer includes a plurality of arch-shaped membrane release regions interposed between adjacent tongue shaped electrodes.

* * * * *